(12) United States Patent
Hong

(10) Patent No.: US 6,786,000 B1
(45) Date of Patent: Sep. 7, 2004

(54) POCKETED HOOP NET

(76) Inventor: Ben Hong, 23196 Maple Ave., Torrance, CA (US) 90505

( * ) Notice: Subject to any disclaimer, the term of this patent is extended or adjusted under 35 U.S.C. 154(b) by 0 days.

(21) Appl. No.: 10/374,188

(22) Filed: Feb. 26, 2003

(51) Int. Cl.[7] ............................................. A01K 69/10
(52) U.S. Cl. ...................................................... 43/105
(58) Field of Search ......................... 43/7, 55, 100–105

(56) References Cited

U.S. PATENT DOCUMENTS

| | | | | |
|---|---|---|---|---|
| 55,635 A | * | 8/1866 | Field ............................ | 43/105 |
| 99,713 A | * | 2/1870 | Sabins .......................... | 43/105 |
| 132,476 A | * | 10/1872 | Livaudis ....................... | 43/105 |
| 563,356 A | * | 7/1896 | Broekermann et al. ........ | 43/65 |
| 1,193,816 A | * | 8/1916 | Ottmann ....................... | 43/105 |
| 1,447,502 A | * | 3/1923 | Asanio et al. ................. | 43/100 |
| 1,453,135 A | * | 4/1923 | Hermanson ................... | 43/100 |
| 1,841,956 A | * | 1/1932 | Juergens ........................ | 43/55 |
| 1,984,239 A | * | 12/1934 | Starks ............................ | 43/7 |
| 2,187,460 A | * | 1/1940 | McIntire ....................... | 43/7 |
| 3,484,981 A | * | 12/1969 | Gilmer ......................... | 43/105 |
| 3,553,881 A | * | 1/1971 | Hasseman ..................... | 43/105 |
| 4,143,480 A | * | 3/1979 | Bott .............................. | 43/105 |
| 4,305,219 A | * | 12/1981 | Ratliffe ......................... | 43/7 |
| 4,706,409 A | * | 11/1987 | Downing ...................... | 43/102 |
| 4,858,372 A | * | 8/1989 | Ray ............................... | 43/55 |
| 4,986,021 A | * | 1/1991 | Thomas ......................... | 43/14 |
| 5,509,227 A | * | 4/1996 | Marrero ......................... | 43/7 |
| 5,673,510 A | * | 10/1997 | Campbell ...................... | 43/105 |
| 5,737,869 A | * | 4/1998 | Murguido ...................... | 43/100 |
| 5,842,304 A | * | 12/1998 | Rivera .......................... | 43/105 |

FOREIGN PATENT DOCUMENTS

| | | | | |
|---|---|---|---|---|
| GB | | 2150801 A | * 12/1983 | |
| JP | | 2003079273 A | * 3/2003 | .......... A01K/77/00 |

\* cited by examiner

Primary Examiner—Peter M. Poon
Assistant Examiner—Bethany L. Griles
(74) Attorney, Agent, or Firm—Clement Cheng

(57) ABSTRACT

A pocketed crab and lobster hoop net comprising a larger outer upper ring, a smaller inner lower ring, and located inside the outer upper ring when the net is laid flat on the sea floor. An intermediate net is woven of mesh between the rings. The mesh conforms to the rings and forms a net having selvage woven around rings retaining the mesh to the ring. A first central net is woven inside the inner lower ring. A second central net is woven inside the inner lower ring parallels the first central net sharing a majority of common selvage. The cord defining a chord and forms an arc shaped pocket opening in cooperation with a first central net, the pocket definition cord having two opposite ends attached to two end points near the circumference of the inner lower ring. A bait pocket is formed between the slack of the second central net and first central net, the pocket capable of holding bait pleasing to crustaceans.

17 Claims, 3 Drawing Sheets

POCKETED HOOP NET

BACKGROUND

Recreational fishermen enjoy catching crabs, lobsters and other crustaceans. Some Dungeness crab in the pacific can grow up to 12" wide and may be caught for food. The strategy for trapping crabs is basically the same as the strategy for trapping any crustacean. Traditionally, fishermen have used 'pots' that are homemade wire cage traps. Pots may hold a bait cage that holds the bait. Bait can range from chicken wing to fish heads. The smell of the bait lures the crab into the trap. Some cages are designed to retain crabs inside the cage. Other cages have holes that allow smaller crabs to escape. When the crab is inside the cage, fishermen remove the cage from the water.

A crab bait cage is usually constructed of metal, and can be heavy. Bait cages are about 3"×6"×6". On the other hand, the bait cage allows a fisherman to conserve the bait and reuse the bait. Nets can also trap crabs and other crustaceans.

The crab ring or hoop net is more delicate than a cage trap but can also catch shellfish, lobster and crabs. A hoop net is usually sold as a 'Crab Net'. Hoop nets have a small inner metal hoop in the center supported by a nylon netting, or the like, which is secured to a larger outer metal hoop. The hoop net usually has a 32" outer upper steel ring and 12" inner lower ring. Mesh netting attaches the two hoops. A fisherman puts the net in the water and the net rests flat on the ocean bottom. When the trap rests on the ocean bottom, crabs congregate to the bait held in a bait cage at the center of the net. Periodically, the net is brought to the surface to see if it has caught any crabs. Fishermen attach rope and floats to the net so that they may leave and return to the float at a later time.

A hoop net catches crabs when crabs enter the net and a fisherman pulls the net out of the water while the crabs are inside the net. When a fisherman pulls the net out of the water, the hoop net forms a basket where the outer ring envelopes the inner ring where the crabs congregate. A ¼'" nylon cord or the like of about 50–100' length attaches the outer hoop to a float that bobs at the surface. A hoop net is about twelve to fourteen inches deep to prevent escape during retrieval. The bait cage is difficult to manage, and adds substantial weight and bulk to the net.

BRIEF DESCRIPTION OF THE DRAWINGS

Figure one is a perspective view of a hoop net being retrieved.

Figure two is a perspective view of a hoop net being deployed and resting on the ocean floor.

Figure 1:
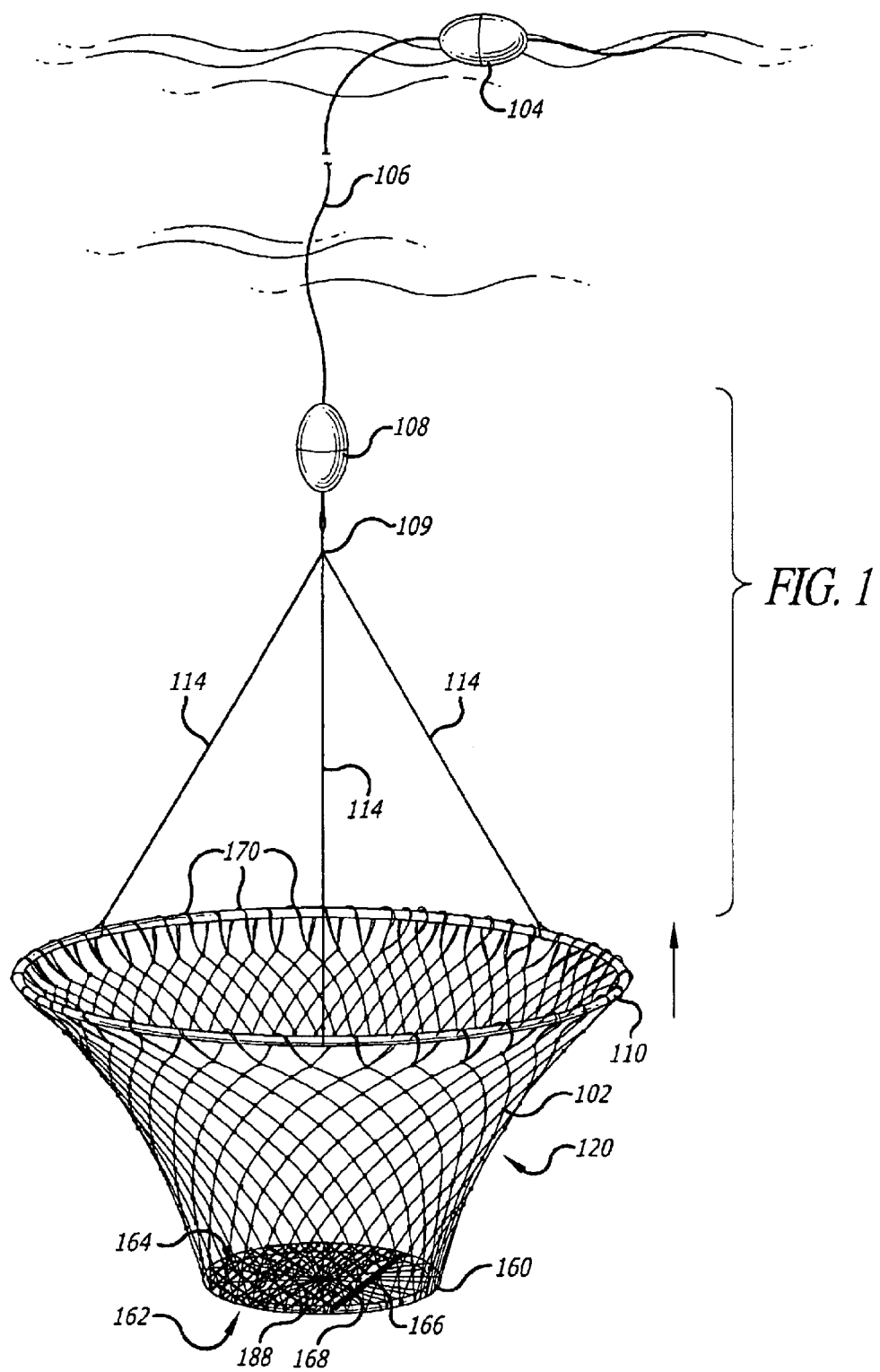
Figure 2:
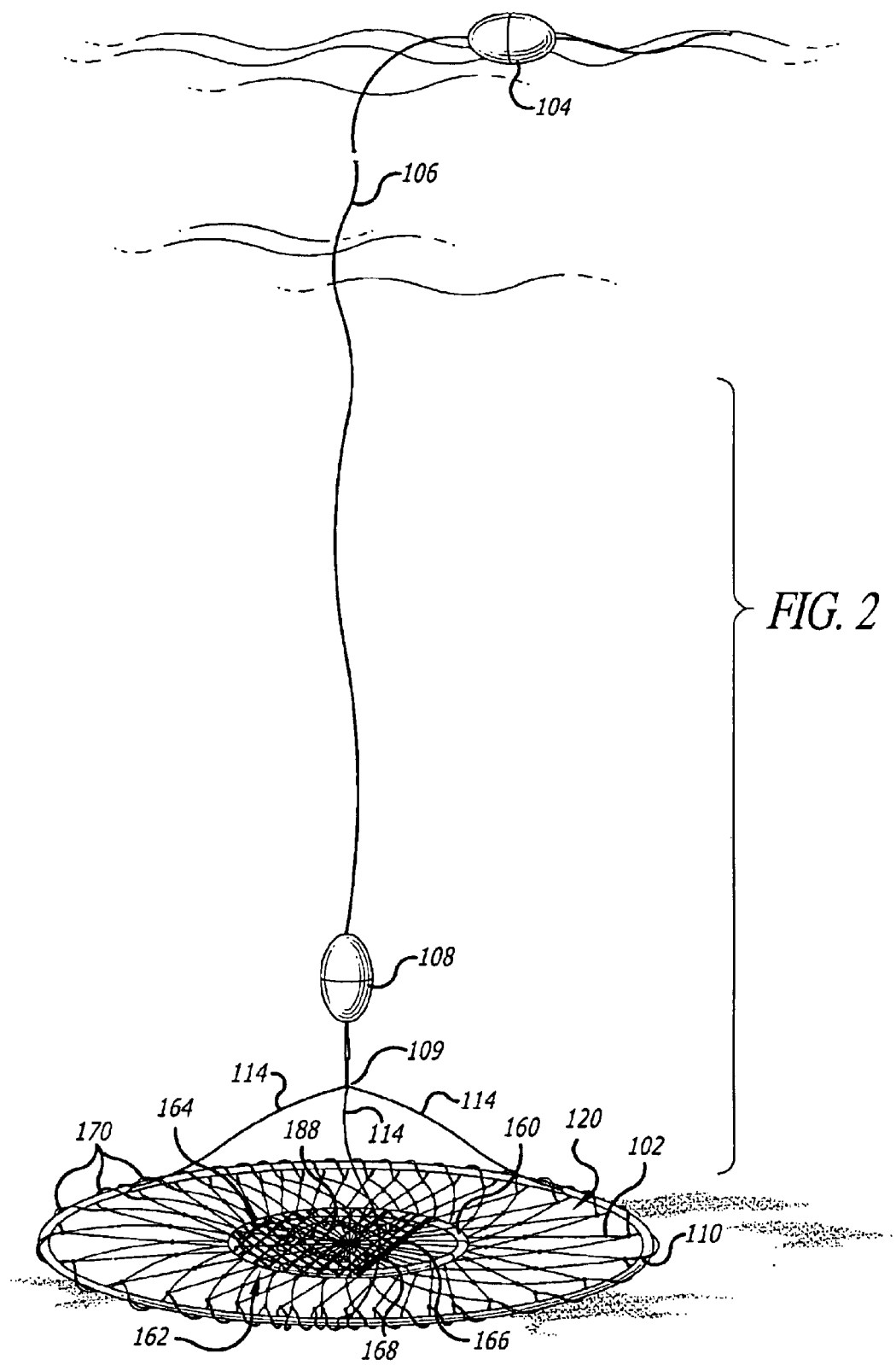
Figure 3:
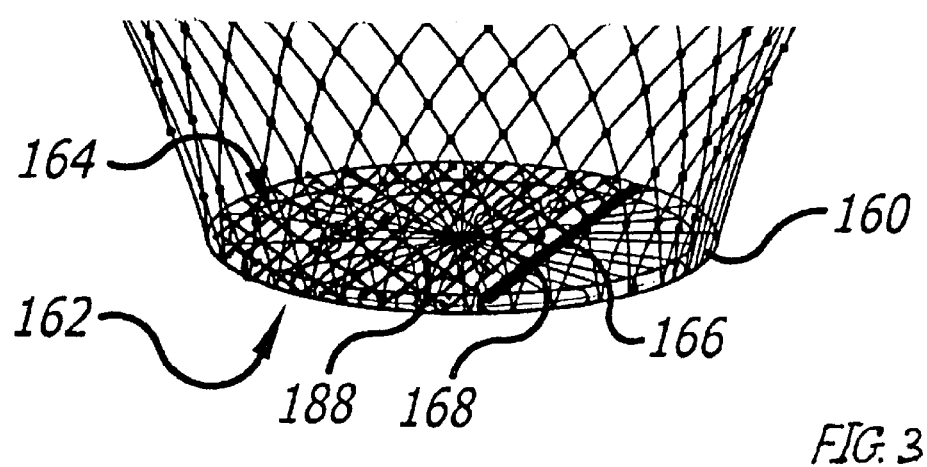

Figure three is a close up view of the pocket in FIG. 1.

DETAILED DESCRIPTION OF THE PREFERRED EMBODIMENT

The improved net comprises double concentric metal rings, a 32" outer upper ring and a 12" inner lower ring. The outer upper ring 110 is connected to the smaller inner lower ring 160 by an intermediate net 120 woven between the rings. The rings can be circular or oval. Circular rings are the best mode. The netting should be composed of polyethylene, or the like, netting material. The netting is connected to two rings made of stainless or galvanized steel. Optionally, a larger net comprises a top ring of 36 inches in diameter while the bottom is 14 inches in diameter. Optionally PVC coating can be applied to the rings for durability.

Mesh material for a net can be made by hand using a long cord and knotted together at uniform and regular intervals. It is commonly known that interweaving and knotting cords create mesh 102 in an arrangement of knotted fabric having evenly spaced, uniform small openings between the cords. Here, weaving mesh 102 to the rings forms a net. Selvage commonly refers to the edge of a fabric that is woven so that it will not fray or ravel. In this case, selvage refers to the cord at the edge of the net woven around the ring for the purpose of retaining the mesh to the ring. The best mode utilizes at least double selvage so that the failure of one selvage strand does not affect the integrity of the intermediate net. Therefore, the termination of the net at the selvage 170 follows the circumference of the inside and outside ring.

The smaller inner lower ring 160 has a first central net woven with selvage enveloping the ring. The smaller inner lower ring has a second central net woven with selvage enveloping most of the ring. The second central net is parallel to the first central net and has a portion of selvage 170 following the profile of and enveloping a pocket opening definition cord 166, the cord 166 defines a chord subtending an arc. A chord is a geometry term, which is a straight line segment having two end points on the circumference of a circle. A chord passing through the center of a circle is a diameter. In the same circle or in equal circles, equal chords subtend equal arcs and equal central angles. Here, the cord defining a chord forms a pocket opening in cooperation with a first central net. The pocket definition cord has two opposite ends that attach to two end points on or near the circumference of the inner lower ring.

The intermediate net 120, first central net and second central net may share common selvage. To deter slipping of the cord defining a chord of the lower ring, an optional circumferential cord follows the circumference of the ring and knottedly connects to itself to allow selvage to be knotted or otherwise axially retained to the circumferential cord. Cords at various intervals can retain the intermediate net 120, first central net and second central net at common selvage attachment points.

A second central net and first central net are not pulled entirely taught but have enough slack to form a bait pocket. The pocket can hold bait pleasing to crustaceans, such as a fish head or chicken wings. The pocket opening definition cord may be semi elastic or pulled taught to prevent bait from falling out of the pocket.

Although it is possible for the pocket opening to face the ocean floor, it is also possible to have the pocket face upward. The benefit of the pocket opening facing the ocean floor is that crustaceans would have a more difficult time removing the bait from the pocket opening. The benefit of the pocket opening facing upward is that it allows a user to more readily access the pocket. The smaller lower inner ring forming the bait pocket may be flipped over by a user desiring to invert the orientation of the pocket on the net. If bridle connections interfere, a user may untie a bridle connection and retie a bridle connection to change the orientation of the pocket opening.

When the trap is deployed, both rings rest on the ocean floor. When the trap is recovered, the outside upper ring rises first and draws the outside net upward to form the walls of basket like profile. The lower ring enclosing an inside net forms the bottom portion of a basket like profile. Attached to the twelve to fourteen inch diameter bottom ring is the bait pocket. The bait pocket, which is made up of double layer netting, is where bait 188 is retained to attract crab and lobster. The bait pocket has mesh wide enough to allow crabs and lobsters to pick at the bait 188.

The walls prevent the crabs or lobsters from escaping while the net is being pulled in. Preferably, the walls are about twenty inches high. When fully extended the net is twenty inches in depth, which prevents crab and lobster from escaping from the net when it is pulled to the surface.

Three bridle arms 114 attach to a hundred feet of main rope at one end and the outside upper ring at the other end. The bridle arms attach at points on the outside upper ring of equal distance to each other at one hundred twenty degrees. The bridle arms 114 are knottedly attached to each other at the bridle junction 109 or bridle arm connection point 109 where the three bridles meet and attached to the main rope 106. The main rope 106 is attached to the bridle arms 114 using a reverse braided connection to prevent slippage when the net is drawn back to the surface.

Above the connection of the bridle arms and the rope is a bridle float 108 that raises the bridle arms to ensure that the three bridle arms do not drift or become tangled when the net fully extends when placed in water. Although the bridle float 108 can be placed at a point intermediate to the bridle junction or bridle arm connection point where the three bridles meet, and the top of the main rope 106 at the surface, the best mode is to place the bridle float at a point immediately above the bridle junction 109. At the end of the one hundred feet of rope is a surface marker float 104 to mark the main rope location at the water's surface. The surface marker or markers can be outfitted with reflective material or other light emitting well-known devices for ease of location.

The foregoing describes the preferred embodiments of the invention. Modifications may be made without departing from the spirit and scope of the invention as set forth in the following claims.

CALL OUT LIST OF THE ELEMENTS

100 Hoop Net
102 Knotted Mesh
104 Surface Marker Float
106 Main Rope
108 Bridle Float
109 Bridle Junction
110 Outer Upper Ring
114 Bridle Arms
120 Intermediate Net
160 Inner Lower Ring
162 First Central Net
164 Second Central Net
166 Pocket Opening Definition Cord
168 Bait Pocket
170 Selvage
188 Bait

What is claimed is:

1. A crab and lobster hoop net comprising:
   a. A larger outer upper ring;
   b. A smaller inner lower ring, located inside the outer upper ring when the net is laid flat on the sea floor, wherein the outer upper ring is connected to the smaller inner lower ring by;
   c. An intermediate net woven of mesh between the rings, wherein the intermediate net is composed of mesh material knotted together at uniform and regular intervals to create interwoven knotted mesh fabric having evenly spaced, uniform small openings between the cords, wherein weaving mesh conforming to the rings forms a net having selvage woven around rings retaining the mesh to the ring, the selvage attaching along the circumference of the inside and outside ring;
   d. A first central net woven inside the inner lower ring permanently closed not allowing passage of catch and having selvage enveloping the inner lower ring, wherein the inner lower ring has a second central net woven with selvage enveloping most of the ring;
   e. A second central net woven inside the inner lower ring is mounted in a generally parallel plane to the first central net and shares a majority of common selvage, but having a portion of selvage following the profile of a pocket opening definition cord, the cord defining a chord subtending an arc, wherein the cord defining a chord and forms an arc shaped pocket opening in cooperation with a first central net, the pocket definition cord having two opposite ends attached to two end points near the circumference of the inner lower ring;
   f. A bait pocket formed between the slack of the second central net and first central net, the pocket capable of holding bait pleasing to crustaceans,
      wherein when the trap is deployed, the two concentric rings rest on the ocean floor, such that when the trap is recovered, the outside upper ring rises first and draws the intermediate net upward to form the walls of a basket like profile, wherein the lower ring enclosing an inside net forms the bottom portion of a basket like profile, the walls preventing crustaceans from escaping while the net is being retrieved.

2. The crab and lobster hoop net of claim 1, further comprising a circumferential cord following the circumference of the ring and knottedly connecting to itself to allow selvage to be knotted or otherwise axially retained to said circumferential cord, to deter slipping of the cord defining a chord of the lower ring, wherein cords at various intervals can retain the intermediate net, first central net and second central net at common selvage attachment points.

3. The crab and lobster hoop net of claim 1, further comprising:
   More than two bridle arms, wherein each bridle arm is attached a bridle arm upper end at a bridle arm connection point and attached to the outside upper ring at a bridle arm lower end, said bridle arms attached at points on the outside upper ring.

4. The crab and lobster hoop net of claims 3, further comprising:
   A main rope;
   A surface marker float connected at a surface end of a main rope for marking the main rope location at the water's surface.

5. The crab and lobster hoop net of claim 3, wherein said mesh is made by hand.

6. The crab and lobster hoop net of claim 3, wherein said uniform small openings between the cords are about 6" wide.

7. The crab and lobster hoop net of claim 3, wherein said uniform small openings between the cords are less than 6" wide.

8. The crab and lobster hoop net of claim 3, wherein said uniform small openings between the cords are more than 6" wide.

9. The crab and lobster hoop net of claimed 1, further comprising:
   More than two bridle arms;
   A main rope, wherein each bridle arm is attached to said main rope at a bridle arm upper end and attached to the outside upper ring at a bridle arm lower end, said bridle arms attached at points on the outside upper ring, wherein the bridle arms knottedly connect at a bridle arm connection point on the main rope.

10. The crab and lobster hoop net of claim 9, further comprising:

A bridle float connected to the main rope at a point immediately above the bridle arm connection point.

11. The crab and lobster hoop net of claim 9, further comprising:

A surface marker float connected at a surface end of a one hundred foot main rope for marking the main rope location at the water's surface.

12. The crab and lobster hoop net of claim 9, further comprising:

A surface marker float connected at a surface end of a main rope for marking the main rope location at the water's surface.

13. The crab and lobster hoop net of claim 9, wherein said mesh is made by hand.

14. The crab and lobster hoop net of claim 9, wherein said pocket definition cord having two opposite ends attached to two end points near the circumference of the inner lower ring subtends an angle of 20 degrees from the center of the inner lower ring.

15. The crab and lobster hoop net of claim 9, wherein outer upper ring and said smaller inner lower ring are oval in shape.

16. The crab and lobster hoop net of claim 9, wherein said larger outer upper ring and said smaller inner lower ring are circular in shape.

17. A crab and lobster hoop net comprising:

i. a larger outer upper ring;

j. a smaller inner lower ring, concentric to the outer upper ring, wherein the outer upper ring is connected to the smaller inner lower ring by;

k. an intermediate net woven of mesh between the rings, the selvage attaching along the circumference of the inside and outside ring;

l. a first central net woven inside the inner lower ring having selvage enveloping the inner lower ring, wherein the inner lower ring has a second central net woven with selvage enveloping most of the ring;

m. a second central net woven inside the inner lower ring parallels the first central net sharing a majority of common selvage, but having a portion of selvage following the profile of a pocket opening definition cord, the cord defining a chord subtending an arc, wherein the cord defining a chord and forms an arc shaped pocket opening in cooperation with a first central net, the pocket definition cord having two opposite ends attached to two end points on the circumference of the inner lower ring;

n. a bait pocket formed between the slack of the second central net and first central net.

* * * * *